UNITED STATES PATENT OFFICE

SIDNEY B. COLTON, OF BLOOMFIELD, CONNECTICUT.

IMPROVEMENT IN MEDICATED CANDY.

Specification forming part of Letters Patent No. 134,979, dated January 21, 1873.

*To all whom it may concern:*

Be it known that I, SIDNEY B. COLTON, of Bloomfield, in the county of Hartford and State of Connecticut, have invented certain new and useful Improvements in Medicinal Candy, of which the following is a specification:

The ingredients to be mixed with the candy are a powder and a mixture of essential oils.

The proportions and ingredients of the powder are as follows: Take of powdered calamus two ounces; of powdered gum myrrh, four ounces; and of powdered gum guiac, three ounces, all to be thoroughly mixed.

The essential oils employed are peppermint, one ounce; cinnamon, one ounce; sassafras, one ounce; hemlock, one ounce; anise, one ounce; winter-green, one ounce; and of capsicum, from one-fourth to one-half an ounce.

One ounce of the liquid is mixed with one ounce of the powder, and the resultant two ounces are mixed with fifty pounds of sugar, the mixing being done with the sugar when it is poured out on the slab preparatory to working. The mixing can be done while the candy is boiling; but this is inconvenient, because it tends to dissipate the strength of the medicine, and also because the boiling mixture throws off odors and effects which affect the throats of persons standing by unpleasantly.

When the whole of the essential oils are employed the candy resultant is a pleasant and effective cough-candy.

It is intended to use the powder in all combinations of the above-described ingredients with candy; but the use of the essential oils may be varied for different medicinal effects. For instance, hemlock and winter-green have a strong diuretic effect, and if these oils are employed to the exclusion of the others the candy will have a stronger diuretic effect. In the same way, if peppermint, cinnamon, and capsicum only are employed, the candy will more strongly affect the bowels.

I claim as my invention—

1. The combination of the calamus, myrrh, and guiac with candy, substantially in the proportions and manner specified, and for the purpose set forth.

2. The combination of the calamus, myrrh, and guiac and one, more, or all, of the essential oils specified, with candy, substantially in the proportions and manner specified, and for the purpose set forth.

SIDNEY B. COLTON.

Witnesses:
W. E. SIMONDS,
ROBT. B. RUGGLES.